United States Patent

[11] 3,583,533

[72] Inventors Robert H. Jones, Jr.;
Richard B. Jones, both of, c/o J. & J. Casting, Inc. R.R.I. Box 267, Hibbing, Minn. 55746
[21] Appl. No. 837,558
[22] Filed June 30, 1969
[45] Patented June 8, 1971

[54] HELICALLY FINNED BRAKE DRUM
7 Claims, 13 Drawing Figs.
[52] U.S. Cl. ................................................ 188/218R, 188/264R
[51] Int. Cl. .................................................. F16d 65/10
[50] Field of Search ........................................... 188/218, 264; 192/113

[56] References Cited
UNITED STATES PATENTS

| | | | |
|---|---|---|---|
| 2,059,170 | 10/1936 | Farr | 188/264 |
| 2,182,238 | 12/1939 | Rasmussen | 188/264UX |
| 2,265,938 | 12/1941 | Eksersian | 188/264 |
| 2,687,192 | 8/1954 | Butterfield | 188/264 |
| 2,720,947 | 10/1955 | Martin | 188/264 |
| 2,757,970 | 8/1956 | Curell | 188/218X |

*Primary Examiner*—George E. A. Halvosa
*Attorney*—Wilson and Geppert

ABSTRACT: A brake drum of the heavy-duty type especially for use on trucks and busses where the exterior surface of the cast iron drum has a plurality of helical fins thereon arranged at an angle of 45° to the axis of the drum. The fins are either formed of the same material as and integral with the cast iron brake drum, or the fins may be formed on a shell of a higher heat conductivity than cast iron, such as aluminum, that is cast onto and interlocked with a cast iron sleeve forming the inner friction surface. A third embodiment of drum structure utilizes a plurality of aluminum rings pressed onto the cast iron drum and provided with arcuate generally circumferential fins which terminate at each end in an angularly disposed tip or edge to enhance lateral airflow.

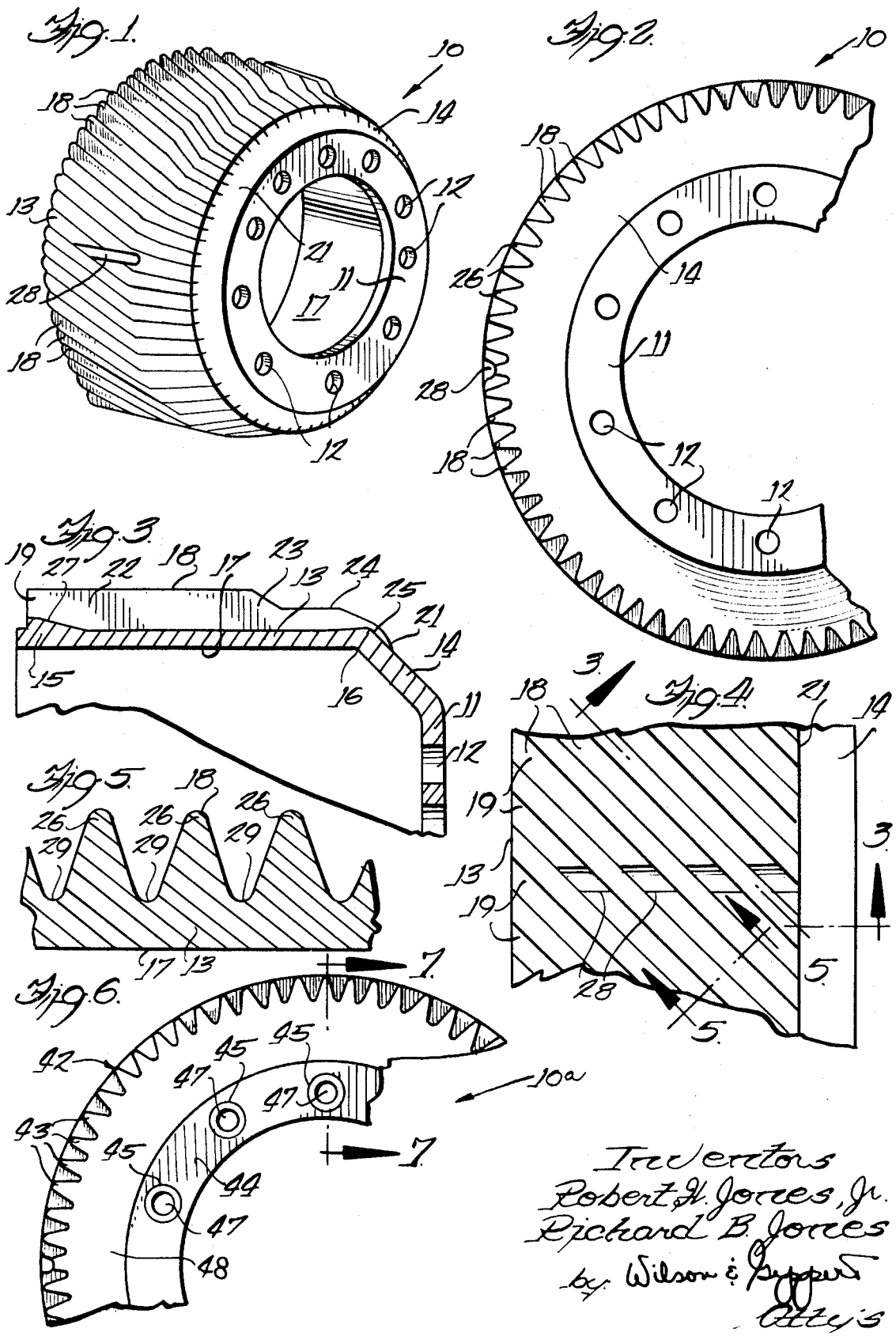

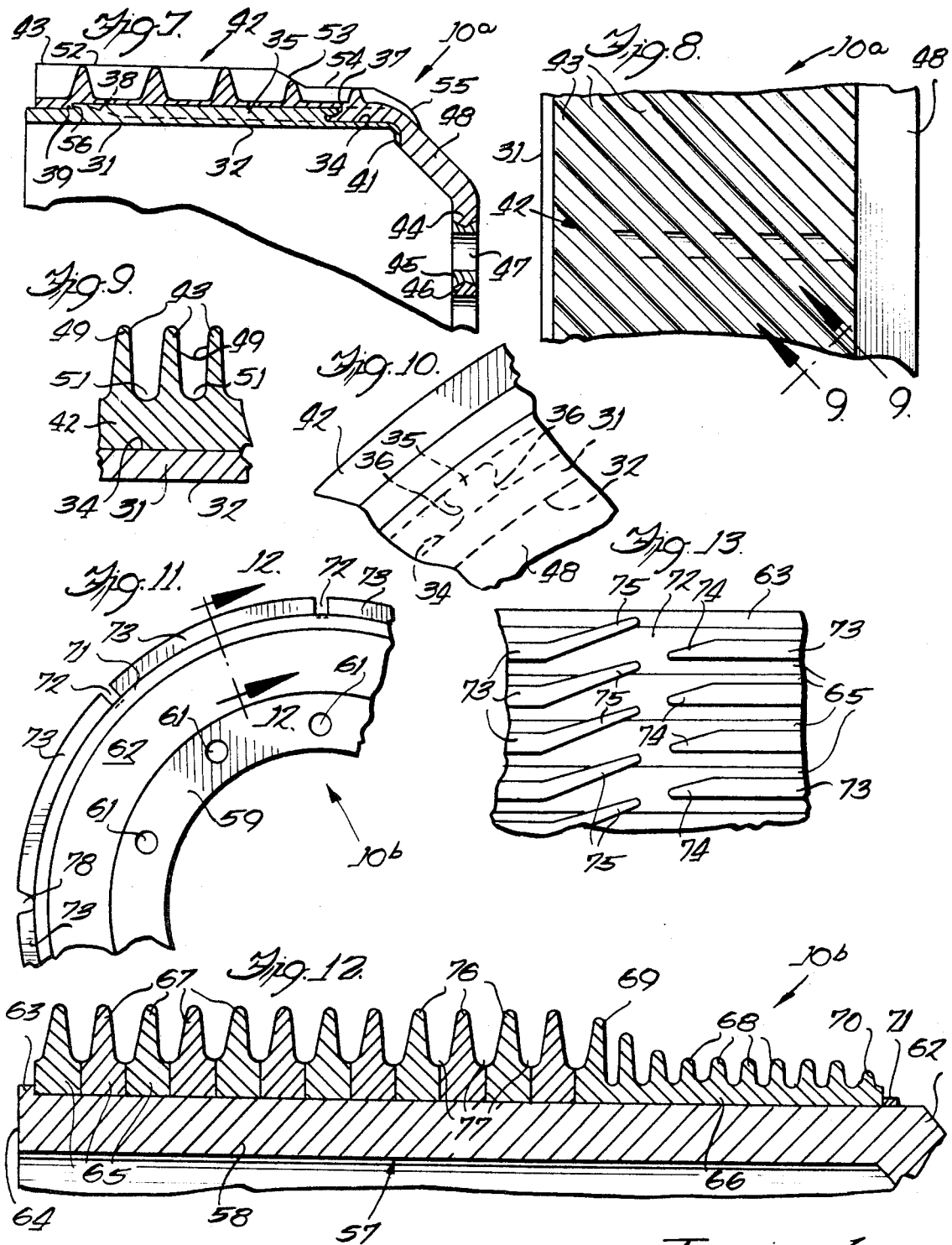

HELICALLY FINNED BRAKE DRUM

The present invention relates to brake drums having fins to enhance the cooling characteristics thereof and more particularly to brake drums having generally helical cooling fins on the exterior surface thereof.

Brake drums are used for automotive vehicles such as cars, buses and trucks, and for airplanes, and the heavy-duty brake drums utilized on buses and trucks have a problem of high heat generation under braking conditions. This heat must be dissipated or the brake drum will have undue expansion due to the generated heat and result in brake "fade" where the brake will not be at full efficiency, or the high heat will cause undue wear on the friction surface of the drum. The present brake drum obviates these problems by the use of a finned exterior surface designed to provide maximum airflow and maximum heat dissipation.

Among the objects of the present invention is the provision of a cast iron brake drum, especially for heavy-duty use for trucks and buses, having the exterior surface helically finned for maximum airflow around the brake drum to dissipate heat generated during braking operations. The helical fins are integral with the cast iron drum and arranged therearound at an angle of 45° to the circumference of the drum. The ends of the fins may be slightly tapered to provide enlarged entrances to enhance airflow into the spaces between the fins. The drum is also built up adjacent the inner and outer edges of the drum portion to reduce distortion and enhance wear characteristics.

Another object of the present invention is the provision of a helically finned brake drum where the drum portion is a cast iron shell and the fins are formed of cast aluminum having higher heat dissipation characteristics. The fins are formed on an annular aluminum cover which is cast onto and interlocked with the cast iron shell to form an integral unit.

A further object of the present invention is the provision of a finned brake drum having a cast iron drum portion and aluminum fins. The fins are formed on aluminum rings that are pressed fit onto the circumference of the cast iron shell. The aluminum fins are formed as generally annular members with the fin being broken into several arcuate segments with the ends of each segment slightly angularly disposed to the body of the fin to enhance airflow through the fins and across the brake drum surface.

Further objects are to provide a construction of maximum simplicity, efficiency, economy and ease of assembly and operation, and such further objects, advantages and capabilities as will later more fully appear and are inherently possessed thereby.

In the drawings:

FIG. 1 is a perspective view of a helically finned brake drum of the present invention.

FIG. 2 is an enlarged partial front elevational view of the brake drum of FIG. 1.

FIG. 3 is a fragmentary cross-sectional view taken on the irregular line 3-3 of FIG. 4.

FIG. 4 is a side elevational view of the brake drum with portions broken away.

FIG. 5 is a cross-sectional view taken on the line 5-5 of FIG. 4.

FIG. 6 is a partial front elevational view of a second embodiment of a helically finned brake drum.

FIG. 7 is a cross-sectional view taken on the line 7-7 of FIG. 6.

FIG. 8 is a partial side elevational view of the brake drum of FIG. 5.

FIG. 9 is a cross-sectional view taken on the line 9-9 of FIG. 8.

FIG. 10 is an enlarged partial front elevational view of the brake drum of FIG. 6.

FIG. 11 is a partial front elevational view of a third embodiment of finned brake drum.

FIG. 12 is a cross-sectional view taken on the line 12-12 of FIG. 11.

FIG. 13 is a partial side elevational view of the drum of FIG. 11 showing the leading and trailing edges of the fin segments.

Referring more particularly to the disclosure in the drawings wherein are shown illustrative embodiments of the present invention, FIG. 1 discloses a finned brake drum 10 of a generally cup shape having a radial flange or face 11 with arcuately spaced perforations 12 for attachment to a conventional wheel (not shown). An annular sidewall or shell 13 is integral with the radial flange 11 and joined by a conical portion 14 to the flange, and has a thickened or reinforced peripheral edge 15 and a built-up portion 16 where the sidewall 13 joins the conical portion 14. The drum is provided with an interior cylindrical friction surface 17 which is engaged by the friction surface of the brakeshoes (not shown).

Formed on the exterior surface of the sidewall 13 are a plurality of fins 18 which are arranged in a helical fashion on the drum at an angle of approximately 45° to the peripheral edge 15 of the sidewall. Each fin 18 has a tapered outer edge 19 and extends in unbroken fashion from the edge 15 to a point 21 slightly beyond the built-up portion 16 on the conical portion 14. Each rib is of a substantially constant height at 22 over approximately two-thirds of the width of the sidewall 13, has an inclined portion 23, a reduced height portion 24 and a curved or downwardly tapering portion 25 extending over the built-up portion 16 and merging into the conical portion 14.

The fins 18 are tapered upwardly with a rounded crest 26 and have a base width of approximately two-thirds the height of the fin. The fins 18 are tapered to provide ease of removal from the casting mold in which the brake drum is formed of cast iron. The thicker edge 15 of the drum forms a rib 27 between each adjacent pair of fins. Also, the fins 18 are interrupted at 28 on opposite sides of the drum to provide an access slot for the valve stem (not shown) for the tire. The tire has a hub which generally fits over the drum so that the tire substantially encompasses the drum to inhibit normal air circulation if the fins were not present. The tire hub has openings or slots therein to provide for air circulation from the finned brake drum.

The helical formation of the fins 18 on the brake drum 10 arranged at the approximate 45° angle relative to the axis of the drum provides for maximum air pull into the spaces between the fins 18 and for maximum airflow around the brake drum 10 so as to obtain the most efficient dissipation of heat caused by friction when the brakes are applied for slowing or stopping. The use of the fins 18 and the curved surface 29 (FIG. 5) at the bottom of and between the fins provides a maximum cooling area to be contacted by the airflow therethrough. The brake drum is formed of cast iron and the addition of the fins 18 increases the strength of the drum and the resistance to cracking across the width of the drum. Also, the shape of the fins 18 resists breakage thereof.

With the addition of the fins, less tensile strength is required for the material of the drum, consequently a cast iron of a lower strength but having better wear characteristics and better heat dissipation characteristics can be used in the formation of the brake drum. A cast iron brake drum formed with the helical fins as shown in FIGS. 1—4 was tested on a truck along with a "Centrifuse" brake drum over mountainous terrain between Minneapolis, Minnesota, and Seattle, Washington, for a period of 90 days and a total mileage of 40,000 miles. On comparison, the drums showed the following characteristics:

TABLE I

| Characteristic | Present drum | "Centrifuse" drum |
|---|---|---|
| Wear | Very little wear | 0.04.0 inch (1/3 rd. worn out). |
| Heat checking | None | Excessively checked and grooved. |

The linings in the drum of the present invention showed approximately 50 percent less wear than the linings in the "Centrifuse" brake drum.

FIGS. 6—10 disclose a second embodiment of brake drum 10$^a$ having a cast iron liner 31 (FIGS. 7 and 9) with a cylindrical inner surface 32 adapted to be frictionally engaged by a brakeshoe (not shown), and a cylindrical exterior surface 34 provided with parallel undercut ribs 35 which are circumferentially spaced on the surface 34; the ribs 35 being undercut along the sides at 36 and at the ends at 37. The cylindrical surface 34 tapers at 38 to provide a thicker outer peripheral edge 38 with a circumferential shoulder 39 spaced from the edge. The inner edge 41 of the liner 31 curves inwardly to provide a very small radial flange.

The cooling fins 43 are formed on a die cast aluminum shell 42 which is cast directly onto the cast iron liner 31 and provides the helical fins 43 and a radial flange 44 provided with knurled steel inserts 45 which are undercut at 46 and have openings 47 for the bolts to retain the tire on the axle and drum. The inserts 45 and the liner 31 are properly positioned in a die casting mold and the aluminum is cast around these elements with the aluminum interlocked to the liner through the undercut ribs 35 and providing the conical portion 48 as well as the flange 44.

The cooling fins 43 are helically arranged on the drum at an angle of approximately 45° to the drum axis, but are generally thinner than the fins 18 of the drum 10 within the capabilities of the casting molds for aluminum, and are provided with rounded crests 49 and rounded roots 51 to provide a greater cooling area than the cast iron drum 10. The fins are each provided with a portion 52 of constant height, an inclined portion 53, a portion 54 of a lesser height and a rounded portion 55 merging into the conical drum portion 48. The portion 52 also has an interior shoulder 56 cooperating with the shoulder 39 on the liner 31.

This embodiment provides the same advantages as the first embodiment and has the further advantage of greater heat dissipation due to the higher heat conductivity of the aluminum fins. Also, as the die cast aluminum fins do not need to be of such wide dimension, so that more fins will cover the brake drum circumference, thus increasing the surface area and the heat dissipation available during operation of the tire and brake.

FIGS. 8—10 disclose a third embodiment of finned brake drum 10ᵇ having a cast iron shell 57 with a sidewall 58 and a radial flange 59 containing openings 61 and joined to the sidewall by a conical portion 62. An annular stop 63 is formed with and on the exterior surface of the sidewall 58 adjacent the peripheral edge 64. The fins are formed on the brake drum by the press fitting of a plurality of annular aluminum die cast rings 65, 66 onto the sidewall 58 of the cast iron shell 57.

The die cast rings 65 are all identical and are each provided with a generally annular fin 67 of full height with the first ring abutting the integral annular stop 63 and the remaining rings abutting each other. The die cast ring 66 includes approximately 10 generally annular fins 68 which are graduated in size from full height at 69 to a reduced height at 70. The ring 66 abuts the end ring 65, and the rings 65 and 66 are retained on the shell 57 by an inner annular ring 71 press fitted or otherwise suitably secured onto the sidewall 58 adjacent the conical portion 62.

Each of the annular fins 67 and 68 are interrupted by circumferentially spaced openings 72 to provide preferably six arcuate fin segments 73 around a given circumference of the drum. The trailing portion of each arcuate fin segment has a converging end 74 and the leading portion of each arcuate fin has a tapered and angularly disposed air scoop and deflector 75 extending laterally to a point almost aligned with the next trailing end 74 of a fin segment of an adjacent ring. The taper of the trailing end 74 is directed toward the angularly disposed deflector 75 of the next adjacent ring.

This configuration of the ends of the arcuate fin segments 73 occurs for the individual rings 65 carrying a single annular fin 67 and for the single ring 66 carrying the graduated rings 68. The fins all have rounded crests 76 and rounded roots 77, with the break between adjacent rings 65 occurring in the rounded root portion 77. The fins are interrupted at 78 on diametrically opposite sides of the drum to provide an access groove for the air valve stem (not shown) of a tire. Also, the angularly disposed deflectors 75 and tapered trailing edges 74 are arranged in opposite directions for right- and left-hand brake drums.

As seen from FIG. 10, the air scoops and deflectors 75 aid in channelling air into and between the fins 67 and 68 in the root portions 77 and in moving the air transversely across the drum from the inside peripheral edge 64 to the conical portion 62 to exit through suitable openings in the tire rim covering the brake drum. The enhanced heat conductivity of the aluminum fins provides an efficient dissipation of the heat caused during operating and braking of the motor vehicle. The rings 65 and 66 could alternately be heat shrunk onto the sidewall 55 of the shell 57 by heating the ring, positioning the heated ring onto the shell and cooling the ring to shrink it onto the sidewall 58.

We claim:

1. A finned brake drum for an automative vehicle to dissipate excess heat caused by braking, comprising a generally cylindrical shell joined to a radial mounting flange at one edge by a conical portion, said shell having an interior continuous cylindrical smooth braking surface, and a plurality of helically arranged substantially linear fins disposed at an angle of approximately 45° to the periphery of the drum and extending generally radially from the exterior surface of the shell, said fins being radially tapered and extending across the shell from the outer periphery to the conical portion, said fins being of full height from the outer shell periphery to approximately the midpoint of the shell and then of a reduced height extending to and terminating adjacent the juncture of the cylindrical shell with the conical portion by gradually merging into the conical portion.

2. A finned brake drum as set forth in claim 1, in which said shell is provided with a tapered thicker peripheral edge and with a built-up portion at the juncture of the inner edge of the braking surface with the conical portion.

3. A finned brake drum as set forth in claim 1, in which said cylindrical shell is formed of cast iron and said fins and radial flange are formed on an outer shell of aluminum cast onto said cylindrical shell, and means to interlock said cylindrical shell and outer finned shell together including a plurality of circumferentially spaced undercut ribs formed on the outer surface of said cylindrical shell and parallel to the axis thereof, and said outer shell is cast onto said cylindrical shell and envelops said undercut ribs.

4. A finned brake drum for an automotive vehicle comprising a generally cylindrical shell with a radial mounting flange at one edge, said shell having an interior continuous cylindrical smooth braking surface, and a plurality of generally circumferentially arranged fins extending radially from the exterior surface of said shell, each fin being generally circular and interrupted at a plurality of points on the circumference of the shell, said circular rows of interrupted fins providing axially aligned rows of arcuate fin segments having spaces between the ends thereof, the trailing end of each fin segment being tapered and the leading end of each fin segment being tapered and angularly disposed to the fin so that the tip of the leading end is generally circumferentially aligned with the trailing end of a segment of a laterally removed adjacent circular row of fin segments.

5. A finned brake drum as set forth in claim 4, in which said fins are formed on annular rings of a higher heat conductivity material than the cylindrical shell, said annular rings being frictionally engaged on the cylindrical outer surface of the shell, each ring carrying a circumferentially interrupted ring of arcuate fin segments of full height, and a wide ring including several successive rings of arcuate fins of progressively reduced height.

6. A finned brake drum as set forth in claim 5, in which said cylindrical shell includes a radially outwardly extending shoulder at the peripheral edge thereof, said finned rings abutting said shoulder and each other, and an annular ring frictionally secured on said shell abutting the edge of the innermost ring to retain the rings on the cylindrical shell.

7. A finned brake drum as set forth in claim 5, in which said finned rings are formed of aluminum.